June 2, 1959
N. R. SANDAGE
2,889,155
RETRACTABLE TRAILER HITCH
Filed May 23, 1958
2 Sheets-Sheet 1
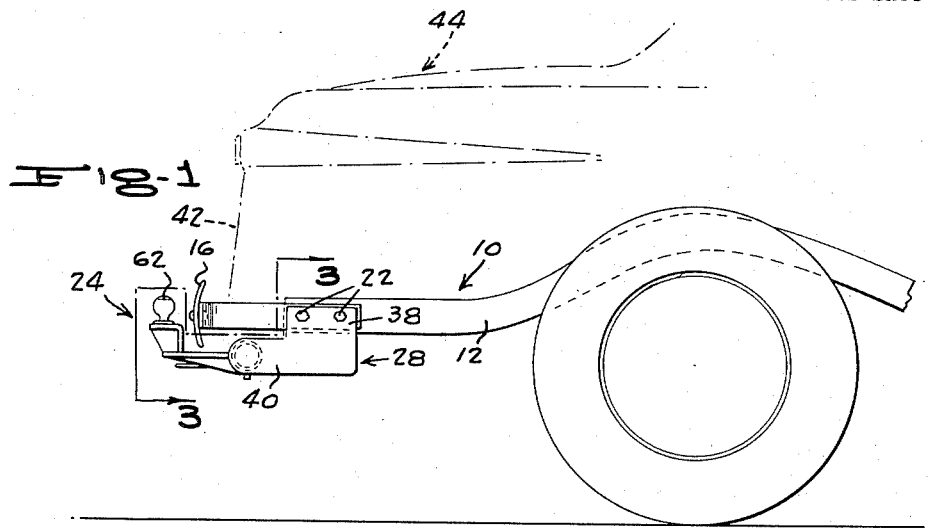
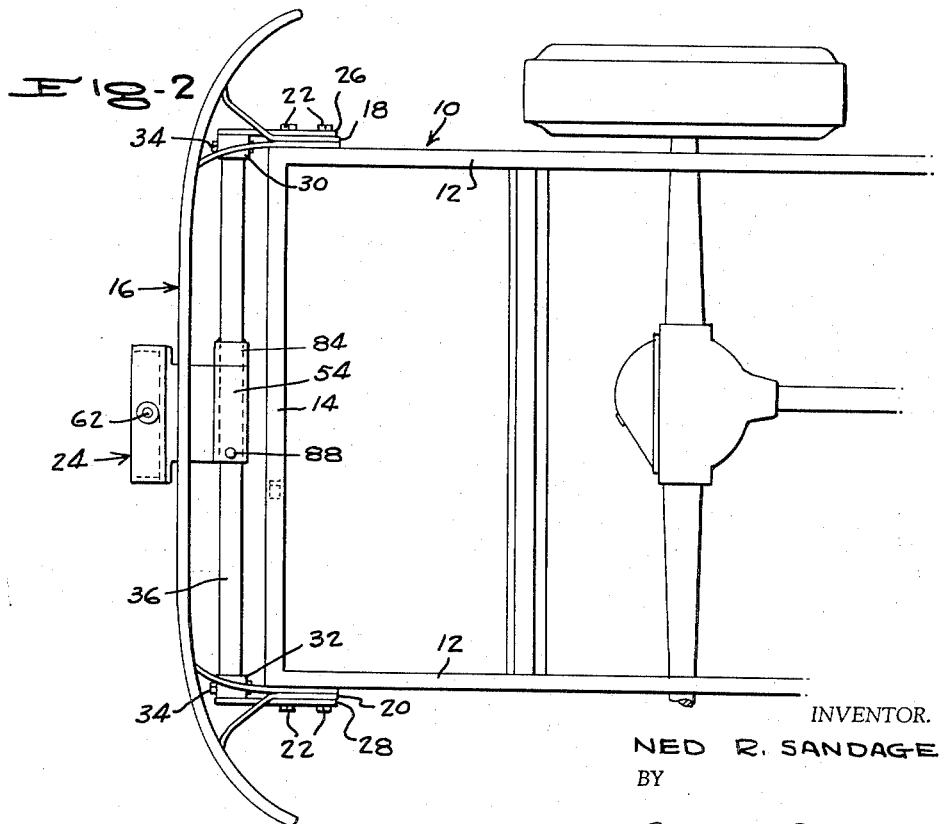
INVENTOR.
NED R. SANDAGE
BY
McMorrow, Berman & Davidson
ATTORNEYS

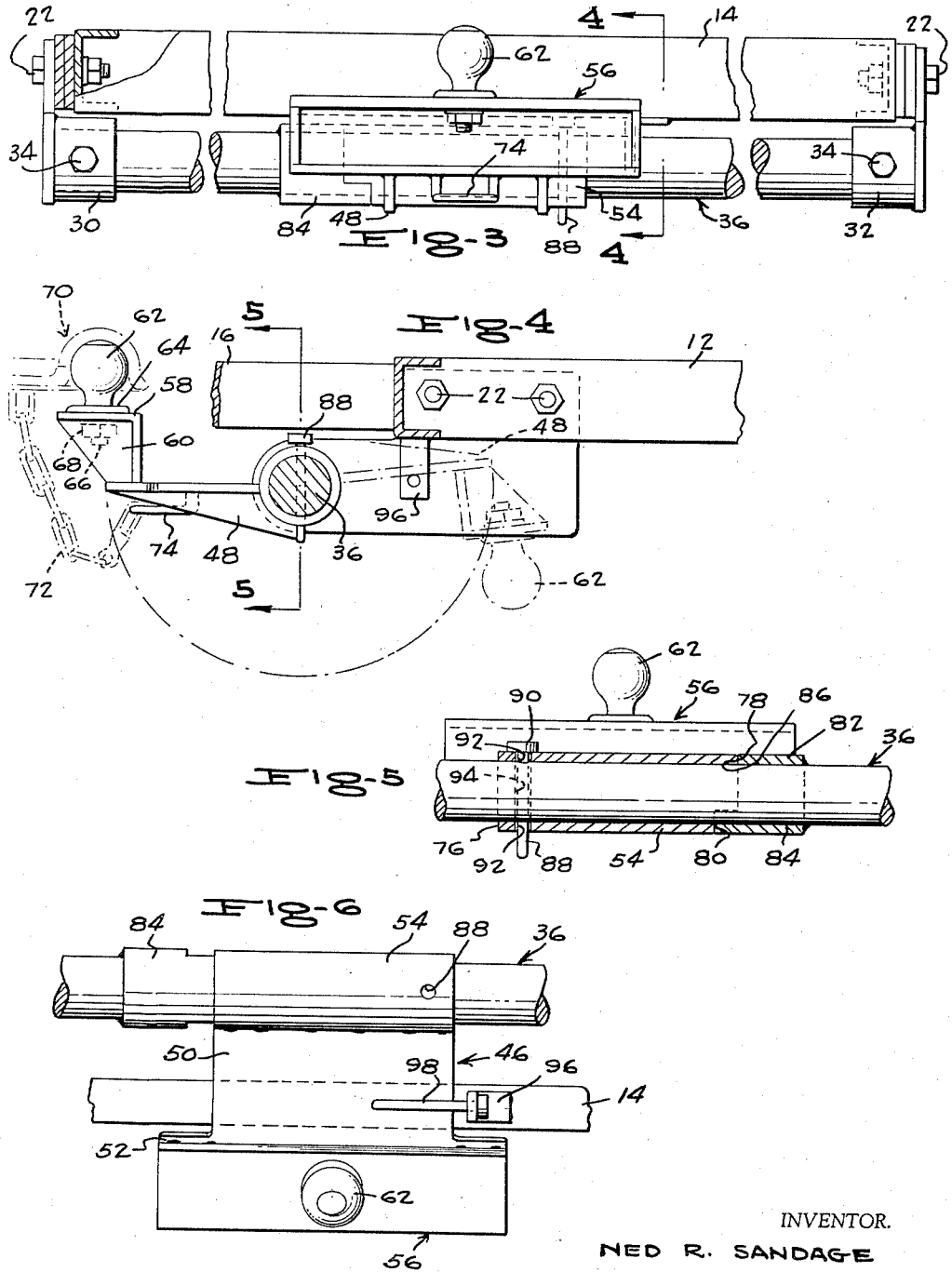

United States Patent Office 2,889,155
Patented June 2, 1959

2,889,155
RETRACTABLE TRAILER HITCH
Ned R. Sandage, Los Angeles, Calif.
Application May 23, 1958, Serial No. 737,296
4 Claims. (Cl. 280—491)

This invention relates to improvements in retractable hitches for vehicles, such as passenger automobiles, and more particularly to an improved hitch of this kind which is swingable forwardly from an extended hitching position behind an associated vehicle, to a retracted storage position beneath and concealed by the vehicle.

The primary object of the invention is to provide a more practical, efficient, and more easily extended and retracted vehicle trailer hitch which is designed to be mounted directly on the chassis frame of the vehicle, so that the stresses and strains of hauling and manipulating a trailer connected to the hitch are imposed on and distributed exclusively to the chassis frame, and which has no components which engage the rear bumper of vehicle and involving the bumper as a component of the hitch.

Another object of the invention is to provide a hitch of the character indicated above which is uncomplex in construction, is composed of a small number of simple and easily assembled parts, and which is easily mountable on a vehicle chassis frame, as by means of existing bolts serving as mounting means for the brackets of an existing bumper.

A further object of the invention is to provide a hitch of the character indicated which has simpler and more efficient means for manually locking the hitch in extended and in retracted positions, without the use of tools.

Other important objects and advantageous features of the invention will be apparent from the following description and the accompanying drawings, wherein, for purposes of illustration only, a specific form of the invention is set forth in detail.

In the drawings:

Figure 1 is a right-hand side elevation, partly in phantom lines of the rear part of a passenger automobile having a chassis frame carrying a rear bumper, and showing a hitch of the invention mounted on the chassis frame and in extended position;

Figure 2 is a top plan view of Figure 1;

Figure 3 is an enlarged contracted vertical transverse section taken on the line 3—3 of Figure 1;

Figure 4 is a vertical longitudinal section taken on the line 4—4 of Figure 3 showing the hitch in extended position and engaged by a trailer hitch socket in full lines; and in retracted or folded position in phantom lines;

Figure 5 is a fragmentary vertical transverse section taken on the line 5—5 of Figure 4; and Figure 6 is a fragmentary bottom plan view showing the hitch held in retracted storage position.

Referring in detail to the drawings, wherein like numerals designate like parts throughout the several views, the numeral 10 generally designates an automobile chassis frame having side members 12 which are spaced and connected at their rear ends by a rear cross member 14. Spaced behind and substantially on a level with the rear cross member 14 is a rear bumper 16, having forwardly projecting left and right-hand bumper brackets 18 and 20, engaged with the outward sides of the chassis side members 12 and secured thereto by means of bolts or studs 22. Shown associated with the above described chassis components is a retractable hitch of the present invention, which is generally designated 24.

The hitch 24 comprises left and right-hand bracket plates 26 and 28, respectively, which are engaged with the outward sides of the bumper brackets 18 and 20, respectively, and fixedly mounted on the chassis side members 12 by means of the bolts or studs 22 extended through the bracket plates 26 and 28. In some cases the original bolts or studs 22 can be used in this connection, and in other cases, slightly longer bolts or studs must be used.

The bracket plates 26 and 28 project rearwardly beyond the rear chassis cross member 14 and have secured on their inward sides sockets 30 and 32, in which are secured, as by bolts 34, related ends of a transversely elongated substantially straight and heavy rigid tubular bar or rod 36, which is spaced between and from the bumper 16 and the rear chassis frame cross member 14. As shown in Figure 1, the bracket plates are L-shaped and are composed of horizontally elongated upstanding standard portions 38, through which the bolts or studs 22 pass, and horizontally elongated foot portions 40 which project rearwardly from the standard portions 38, and have the sockets 30, 32 at their rear ends, so that the bar 36 is downwardly offset or displaced to a level close to and below the bumper 16 and the rear chassis cross member 14. This position of the bar 36 will ordinarily locate the same out of sight beneath the rear end 42 of the body 44 of an automobile, so that when the hitch is folded to storage position, the hitch is concealed and no part or parts thereof are visible and no part or parts thereof encumber the bumper 16 or present protuberances which the front bumper of another automobile could injure or become snagged on.

The hitch 24 further comprises a ball hitch arm, generally designated 46, which comprises a flat T-shaped plate comprising a narrow standard portion 50, and a wider crosshead portion 52. The standard portion 50 is fixed at its rear end radially to a tubular sleeve 54 which is rotatably and slidably circumposed on an intermediate part of the bar 36. Fixed on and rising from the crosshead portion 52 of the arm 46 is a transversely elongated angle section bracket 56 which has spaced above the portion 52 a horizontal rearwardly extending flange 58 which reaches rearwardly beyond the rear end of the arm 46, as shown in Figure 4. At the ends of the bracket 56 are reinforcing gussets 60, secured to the flanges of the bracket 56 and the crosshead portion 52 of the arm 46 to provide a strong and rigid structure.

Rising centrally from the flange 58 of the bracket 56 is a hitch ball 62 having an enlarged flange 64 bearing upon the upper side of the flange 58 and a threaded shank 66 which traverses the flange and has on its lower end a securing nut 68 bearing against the underside of the flange 58.

As also shown in Figure 4, a trailer hitch socket 70 is adapted to be engaged over the hitch ball 62, with the arm 46 in its rearwardly extended horizontal position, wherein the hitch ball 62 is spaced behind and substantially on a level with the bumper 16, with the arm 46 slightly spaced below the bumper 16 and out of contact therewith. A safety chain 72 on the trailer hitch socket 70 can be secured to a fixed L-shaped lug 74 on the underside of the arm 46, between reinforcing ribs 48 on the underside of the arm 46.

The sleeve 54 has a squared right-hand or outer end 76 and an inner or left-hand end 78 in which is formed a preferably rectangular notch 80, which defines a projection 82 of relatively great circumferential width. Fixed on the bar 36 at the inner or left-hand end of the sleeve 54 is a collar 84 having in the end thereof facing the sleeve 54, a notch 86 of the same size as and for receiving the projection 82.

A removable locking pin 88 having an enlarged head 90 on its upper end, is provided for locking the sleeve 54 with its projection 82 in the notch 86 of the collar 84, holes 92 in the outer end of the sleeve 54 and a vertical bore 94 through the bar 36 being provided for receiving the pin 88. The notch 86, the projection 82, and the openings accommodating the pins 88 being disposed so that the arm 54 is held in its rearwardly extending horizontal position.

To release the hitch ball arm 46 for folding out of the way, the pin 88 is removed from the holes 92 and the bore 94, and the sleeve 54 is slid outwardly away from the collar 84, so as to disengage the projection 82 from the notch 86, whereupon the arm 46 is swung downwardly and rearwardly and then upwardly beneath the rear chassis cross member 14 to its stored position, as shown in phantom lines in Figure 4.

For holding the arm 46 in its retracted stored position, there is fixed to the underside of the chassis rear cross member 14, at the right-hand or outward end of the sleeve 54, a depending bracket 96 having a removable horizontal headed retaining pin 98 slidably engaged therethrough, which is positioned beneath the standard portion 50 of the arm 46 so as to retain the arm 46 up in its stored position. The arm 46 is releasable to be swung to its extended position simply by removing the pin 98 from under the arm 46.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A retractable trailer hitch comprising a horizontal transverse bar having ends, bracket plates on the bar at the ends thereof for securement to an automobile chassis frame, a sleeve rotatably and slidably circumposed on said bar and having first and second ends, a fixed collar on said bar at said second end of the sleeve, interengageable means on the collar and the second end of the sleeve precluding rotation of the sleeve relative to the bar said sleeve being slidable away from said collar for disengaging said means and freeing said sleeve for free rotation of the sleeve on the bar, removable pin means traversing the bar and the first end of the sleeve for holding the sleeve in a position wherein said means are engaged, a radial arm fixed on and projecting from said sleeve and located to assume a horizontal extended position only while said means are interengaged, said arm having an outer end, and a hitch ball on said outer end.

2. A retractable trailer hitch according to claim 1, wherein said arm when free is swingable to a stored retracted position opposed to said extended position, and holding means attachable to a chassis frame and removably engageable with the arm to hold the same in its retracted position.

3. A retractable trailer hitch according to claim 1, wherein said interengageable means comprises a projection on the second end of the sleeve and a notch in said collar.

4. A retractable trailer hitch according to claim 1, wherein said arm when free is swingable to a stored retracted position opposed to said extended position, and holding means attachable to a chassis frame and removably engageable with the arm to hold the same in its retracted position, said holding means comprising a stationary bracket to be attached to a chassis frame, and a pin removably traversing the stationary bracket and engageable beneath said arm.

References Cited in the file of this patent

UNITED STATES PATENTS

| | | |
|---|---|---|
| 1,508,013 | De Waters | Sept. 9, 1924 |
| 2,378,504 | Roos | June 19, 1945 |
| 2,569,086 | Zenk | Sept. 25, 1951 |
| 2,576,383 | Avery | Nov. 27, 1951 |